US00RE44976E

(19) United States
(12) Reissued Patent
Johnson et al.

(10) Patent Number: US RE44,976 E
(45) Date of Reissued Patent: Jul. 1, 2014

(54) SPEED AND ACCELERATION MONITORING DEVICE USING VISIBLE LASER BEAMS

(75) Inventors: James H. Johnson, Tucson, AZ (US); John DiDomenico, Tucson, AZ (US)

(73) Assignee: Envirotest Systems Holdings Corp., East Granby, CT (US)

(21) Appl. No.: 09/667,693

(22) Filed: Sep. 22, 2000 (Under 37 CFR 1.47)

Related U.S. Patent Documents

Reissue of:
(64) Patent No.: 5,812,249
Issued: Sep. 22, 1998
Appl. No.: 08/717,226
Filed: Sep. 26, 1996

(51) Int. Cl.
*G01F 3/36* (2006.01)

(52) U.S. Cl.
USPC ..... 356/28; 356/438

(58) Field of Classification Search
USPC ..... 250/222.1; 340/942; 702/159; 356/28, 356/438
See application file for complete search history.

(56) References Cited

U.S. PATENT DOCUMENTS

| | | | | |
|---|---|---|---|---|
| 3,630,072 | A | 12/1971 | Traver | |
| 3,872,283 | A * | 3/1975 | Smith et al. | 701/207 |
| 3,908,167 | A | 9/1975 | Hulls et al. | |
| 3,998,095 | A | 12/1976 | Tinkham et al. | |
| 3,999,425 | A | 12/1976 | Collin | |
| 4,247,768 | A * | 1/1981 | Elmer et al. | 250/222.1 |
| 4,924,095 | A | 5/1990 | Swanson, Jr. | |
| 5,099,680 | A | 3/1992 | Fournier et al. | |
| 5,105,651 | A | 4/1992 | Gutmann | |
| 5,210,702 | A * | 5/1993 | Bishop et al. | 702/24 |
| 5,298,738 | A * | 3/1994 | Gebert et al. | 250/222.1 |
| 5,343,043 | A | 8/1994 | Johnson | 250/338.5 |
| 5,381,155 | A | 1/1995 | Gerber | |
| 5,392,034 | A * | 2/1995 | Kuwagaki | 340/933 |
| 5,416,711 | A | 5/1995 | Gran et al. | |
| 5,524,476 | A | 6/1996 | Tedeschi | |
| 5,550,737 | A | 8/1996 | Tedeschi | |
| 5,572,424 | A | 11/1996 | Kellogg et al. | |
| 5,583,765 | A | 12/1996 | Kleehammer | |
| 5,589,629 | A | 12/1996 | Quinn | |

(Continued)

OTHER PUBLICATIONS http://www.epa.gov/otaq/15-remot.htm; "Remote Sensing: A Supplemental Tool for Vehicle Emission Control," Aug. 1993, EPA 400-F-92-017, Fact Sheet OMS-15; 4 pages.

(Continued)

*Primary Examiner* — Mark Hellner
(74) *Attorney, Agent, or Firm* — Pillsbury Winthrop Shaw Pittman LLP

(57) ABSTRACT

Apparatus for obtaining the speed and acceleration of a motor vehicle in which the speed and acceleration are used in combination with exhaust emissions data obtained from the motor vehicle to analyze information about the pollutants being dispersed into the air by the motor vehicle. The apparatus includes a first radiation source producing a visible laser beam received by a first detector and a second radiation source producing a visible laser beam received by a second detector. The first and second radiation sources are arranged along the roadway with a known spacing and at a height so that the visible laser beams are interrupted by the front and rear wheels of the motor vehicle as it passes along the roadway. The detectors provide output pulses indicating whether the visible laser beams are interrupted and the time of the occurrence of each of the pulses is measured and recorded. An analyzer then calculates the speed and acceleration from the known spacing distance and the stored time measurements.

7 Claims, 4 Drawing Sheets

(56) References Cited

U.S. PATENT DOCUMENTS

| | | | | | |
|---|---|---|---|---|---|
| 5,602,638 | A | | 2/1997 | Boulware | 356/28 |
| 5,621,166 | A | | 4/1997 | Butler | |
| 5,639,957 | A | | 6/1997 | Zarchy | |
| 5,693,872 | A | | 12/1997 | Quinn | |
| 5,729,452 | A | | 3/1998 | Smith et al. | |
| 5,821,879 | A | * | 10/1998 | Liepmann | 340/942 |
| 5,835,871 | A | | 11/1998 | Smith et al. | |

OTHER PUBLICATIONS

"An Analysis of On-Road Remote Sensing as a Tool for Automobile Emissions Control," Final Report Prepared by University of Denver Chemistry Department, Colorado, prepared for Illinois Department of Energy and Natural Resources, Mar. 1990, 181 pages.

Bishop, Gary A., et al., "Enhancements of Remote Sensing for Vehicle Emissions in Tunnels," *Air & Waste Management Association*, vol. 44, Feb. 1994, pp. 169-175.

Petherick, David S. E., "Ontario's Indoor, Controlled-Mode Remote Sensing I/M Prescreen Concept," Ministry of Transportation of Ontario, Copyright 1996 Society of Automotive Engineers, Inc., 10 pages.

Stedman, Donald H., et al., "On-Road Carbon Monoxide and Hydrocarbon Remote Sensing in the Chicago Area", Final Report Prepared by University of Denver Chemistry Department, Prepared for Illinois Department of Energy and Natural Resources, Office of Research and Planning, Illinois Contract AQ 40, Project 91/122, Report No. ILENR/RE-AQ-91/14, Oct. 1991, pp. 1-70.

Singer, Brett C., at al., "A Fuel-Based Motor Vehicle Emission Inventory", *Journal of the Air & Waste Management Association*, vol. 46, Jun. 1996, pp. 581-593.

Remote Emissions Sensor RES-100 Smog Dog™ User's Manual, Santa Barbara Research Center, SBRC Ref. 94-0327, Prepared for State of North Carolina, Department of Environment, Health, and Natural Resources, May 1994, 49 pages.

Remote Emissions Sensor RES-100 brochure, Santa Barbara Research Center, 93-0408-16, Jul. 1993, 10 pages.

Jack et al., "A New Instrument for Remote Sensing of Automotive Emissions, the RES-100", Santa Barbara Research Center, TAP93-0820, pp. 1-17, Oct. 11, 1993.

Remote Emissions Sensor RES-100, Smog Dog, An Introduction, Santa Barbara Research Center, 92-0793-2, Apr. 1993, 12 pages.

Morgan, Julie, "The Potential Use of Remote Sensing Devices in Inspection and Maintenance Programs", Prepared for Mobile Sources Section (A-2-1), Region 9, U.S. Environmental Protection Agency, San Francisco, California, Aug. 1995, 38 pages.

* cited by examiner

SPEED AND ACCELERATION MONITORING DEVICE USING VISIBLE LASER BEAMS

Matter enclosed in heavy brackets [ ] appears in the original patent but forms no part of this reissue specification; matter printed in italics indicates the additions made by reissue.

BACKGROUND OF THE INVENTION

Motor vehicles are one of the major contributors to air pollution both in the United States and abroad. Thus, it is desirable to measure exhaust emissions from automobiles under actual operating conditions in order to identify excessively polluting vehicles and either have them repaired or have them removed from the road. Apparatus for detecting and measuring relative concentrations of pollutants such as HC, CO, and $CO_2$ in the exhaust emissions from automobiles under operating conditions have been developed. Examples of such apparatus are shown in U.S. Pat. Nos. 5,343,043 (Johnson) and 5,210,702 (Bishop, et al.), which are incorporated by reference herein.

In order to properly analyze the exhaust emissions data obtained, the speed and/or acceleration of the vehicle at the time the exhaust emissions information was obtained is very useful. More specifically, the emissions test results can be influenced by the specific mode of operation, for example, acceleration or decceleration, of the vehicle under the test. Determining the mode of operation must be performed in a very short distance of travel, so as to capture instantaneously the specific accelerator position. This in turn supplies information about fuel enrichment and fuel deprivation of the engine at the specific time of the emissions test.

Devices have been developed in the past to determine the speed of vehicles. One such device is the radar detector used by law enforcement agencies. Although such radar devices are quite useful, radar waves can reflect off several points of the same vehicle, resulting in obtaining different speeds for the same vehicle traveling at a constant velocity. Another device for determining the speed of motor vehicles is the mechanical switch. Mechanical switches, however, have a great variance in response time. Also, cumbersome methods are needed, such as taping the sensors down to the highway, to keep the switches at a fixed length apart. Still another device is the use of modulated infrared laser beams. The modulated infrared laser beam has a set time for the beam to be on and off. This time translates into time steps that can cause error in the detection of the laser beam and, thus, accurate and reliable results may not be obtained.

BRIEF SUMMARY OF THE INVENTION

In view of the foregoing, it is one object of the present invention to provide an improved apparatus and method for monitoring the speed and acceleration of a motor vehicle, especially over a short distance.

It is another object of the present invention to provide an apparatus and method for accurately and reliably obtaining the speed and acceleration of a motor vehicle using visible laser beams positioned low to the ground.

Another object of the present invention is to detect at least the front wheel and the rear wheel of a motor vehicle using visible, non-modulated laser beams to obtain the speed and acceleration of the motor vehicle.

It is yet another object of the present invention to use the speed and acceleration data in combination with data on pollutants obtained from motor vehicles in-use to analyze exhaust emissions data.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages, of the present invention.

BRIEF DESCRIPTION OF THE SEVERAL VIEWS OF THE DRAWINGS

For the purpose of facilitating an understanding of the invention there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
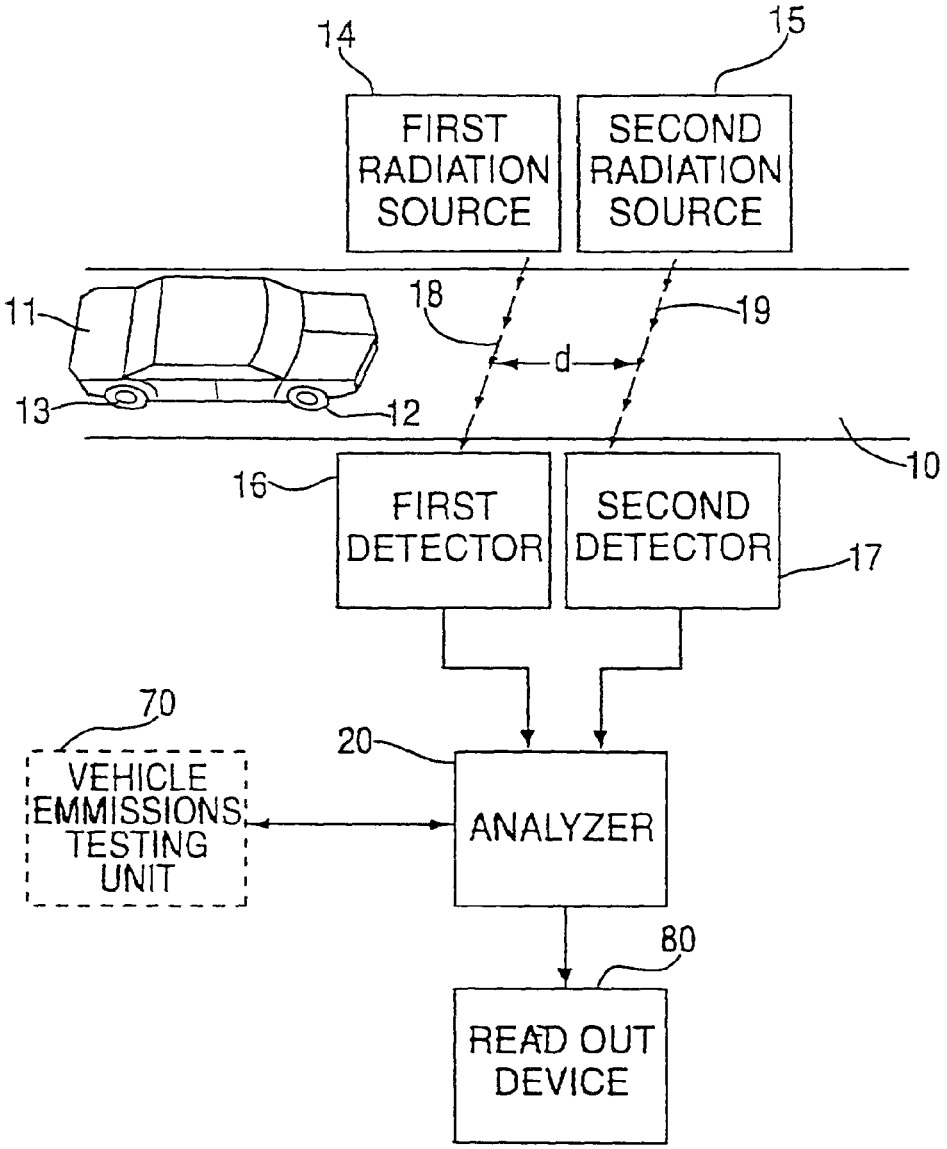
FIG. 1 is a schematic diagram of an embodiment of the present invention shown in use across a roadway.

FIG. 1 illustrates one embodiment of the present invention in use along a roadway 10. A motor vehicle 11 having at least a front wheel 12 and a rear wheel 13 is traveling along a roadway 10. The present invention includes a first radiation source 14, a second radiation source 15, a first detector 16 and a second detector 17. A visible entrance laser beam 18 is emitted from the first radiation source 14 and received by the first detector 16. An visible exit laser beam 19 is emitted from the second radiation source 15 and received by the second detector 17. The entrance laser beam 18 and the exit laser beam 19 are separated by a known fixed distance, d. Although the distance, d, can be any length, in a preferred embodiment, the distance, d, is small, preferably 70 inches.

In a preferred embodiment, the entrance laser beam 18 and the exit laser beam 19 are visible, that is, the laser beams are in the visible light spectrum. Visible laser beams 18, 19, allow the radiation sources 14, 15, to be accurately and precisely aligned with the respective detectors 16, 17, without requiring additional alignment beams, and to be positioned accurately close to the ground to allow only the wheels 12, 13, to be detected. The use of visible laser beams 18, 19, allow the fixed distance, d, between the entrance laser beam 18 and exit laser beam 19 to be precisely set without requiring additional alignment equipment.

The visible laser beams 18, 19, are not modulated and are at a low power level. The use of unmodulated visible laser beams 18, 19, is radically different from the normal infrared lasers or other modulated light sources which spread out over a wide area with low specific area radiation intensity. With the sensors presently known for use, the modulation and beam width can cause inaccuracies that are not tolerable, especially for obtaining the speed, S, and acceleration, A, of a motor vehicle 11 over a short distance, such as 70 inches in the described embodiment.

The detectors 16, 17, can be photo transistors with a 1.5" lens, not shown, and with a bandpass filter of the proper wavelength. The lens allows for some amount of mechanical movement of the detectors 16, 17, without resulting in a false detection of signals. In addition, the detectors 16, 17, may be operated in a saturated mode, which allow them to reject mechanical and electrical noise.

In one embodiment, in order to measure the speed, S, at which a vehicle such as the motor vehicle 11 is traveling, the time period for the motor vehicle 11 to break the entrance laser beam 18 and then break the exit laser beam 19 over a fixed distance, d, is measured in an analyzer 20 based on the known distance d and the outputs of the detectors 16, 17. In the following description, the time when the motor vehicle 11 enters the path of any of the laser beams 18, 19, will be referred to as a "break", and the time when the motor vehicle 11 leaves the path of any of the respective laser beams 18, 19, and the laser beam is re-established, it will be called a "make." The acceleration of the motor vehicle 11 can be calculated in the analyzer 20 by using the rate of change of the speed detected using the front and rear wheels 12, 13, and the two detectors 16, 17.

Figure 2:
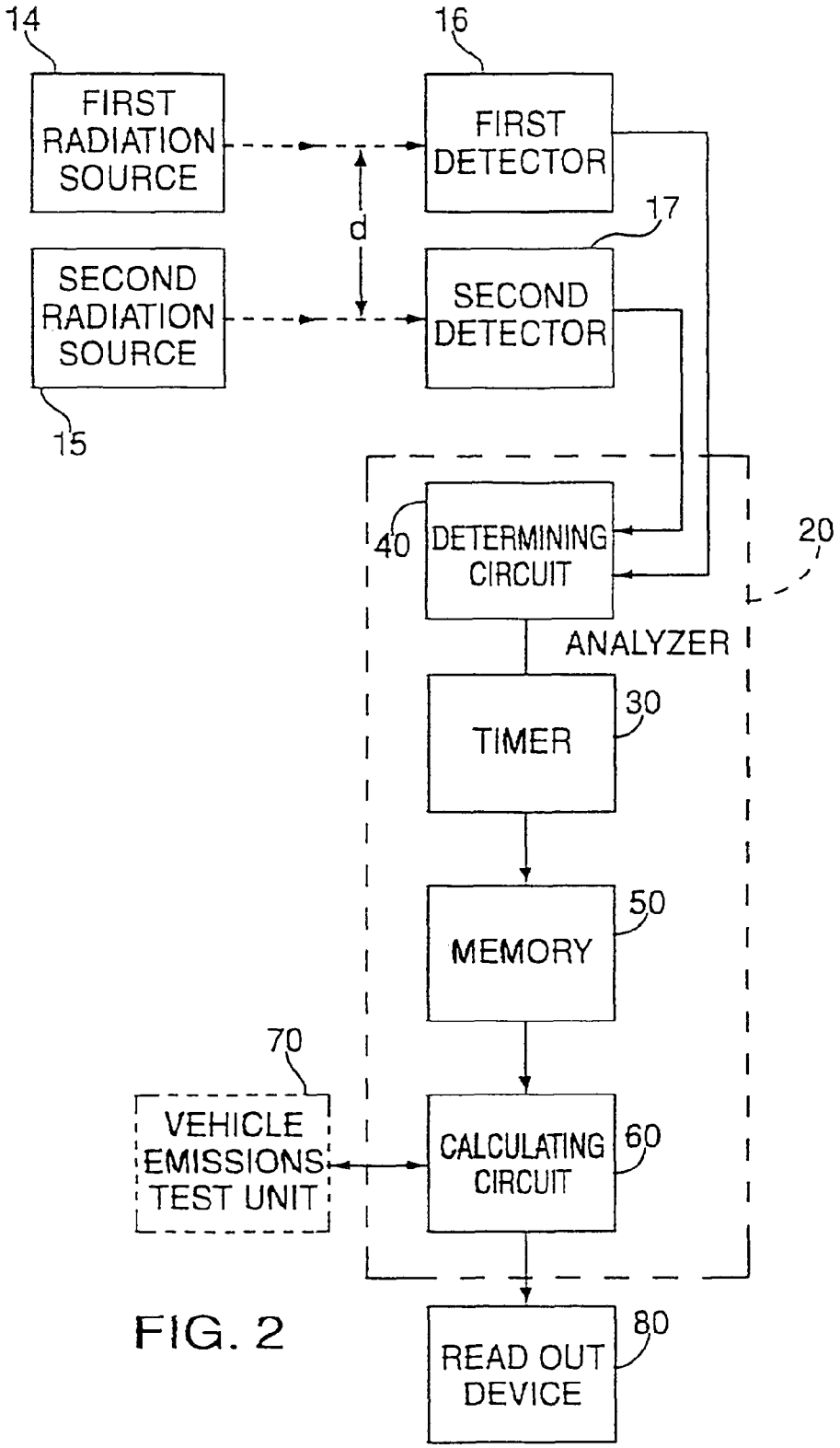
FIG. 2 is a block diagram of an embodiment of the present invention.

As shown in the block diagram of FIG. 2, the analyzer 20 of the present invention includes a timer 30, such as a counter and a clock for measuring time. There are already known various kinds of timers 30 for measuring time, so that it need not be described in detail herein. The timer 30 starts timing the instant the front wheel of the motor vehicle 11 breaks the entrance laser beam 18. The analyzer 20 includes a determining circuit 40 for producing a pulse when the motor vehicle 11 breaks and makes each of the entrance laser beam 18 and the exit laser beam 19. For example, the determining circuit 40 may include a circuit, mechanism and/or algorithm for detecting the presence and absence of the visible laser beam using the respective outputs from the detectors 16, 17. The determining circuit 40 may comprise flip-flops or one-shots that are triggered by changes in the signal levels of the outputs from the respective detectors 16, 17 to indicate the respective break and make of the entrance laser beam 18 and the exit laser beam 19

As shown in FIG. 2, the analyzer 20 also includes a storage circuit or memory 50 for recording the elapsed time each event occurs as timed by the timer 30 that is triggered by the output of the determining circuit 40. For example, the recorder 50 may store the times in the random access memory of a computer forming part of the analyzer 20. The times for the events that the recorder 50 records include the time when the front wheel 13 of the motor vehicle 11 breaks the entrance beam 18, the time when the entrance laser beam 18 is made or re-established, the time when the front wheel 12 of the motor vehicle 11 breaks the exit beam 19, the time when the exit beam 19 is re-established, the time when the rear wheel 13 of the motor vehicle 11 breaks the entrance laser beam 18, and the time when the entrance laser beam 18 is re-established, the time when the rear wheel 13 of the motor vehicle 11 breaks the exit laser beam 19, and the time when the exit laser beam 19 is re-established.

Figure 4:
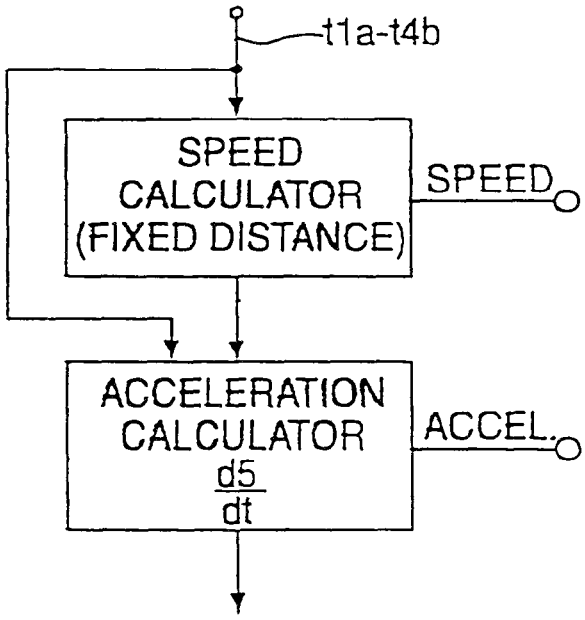
FIG. 4 is a block diagram showing the calculator unit of FIG. 2 in more detail.
Figure 5:
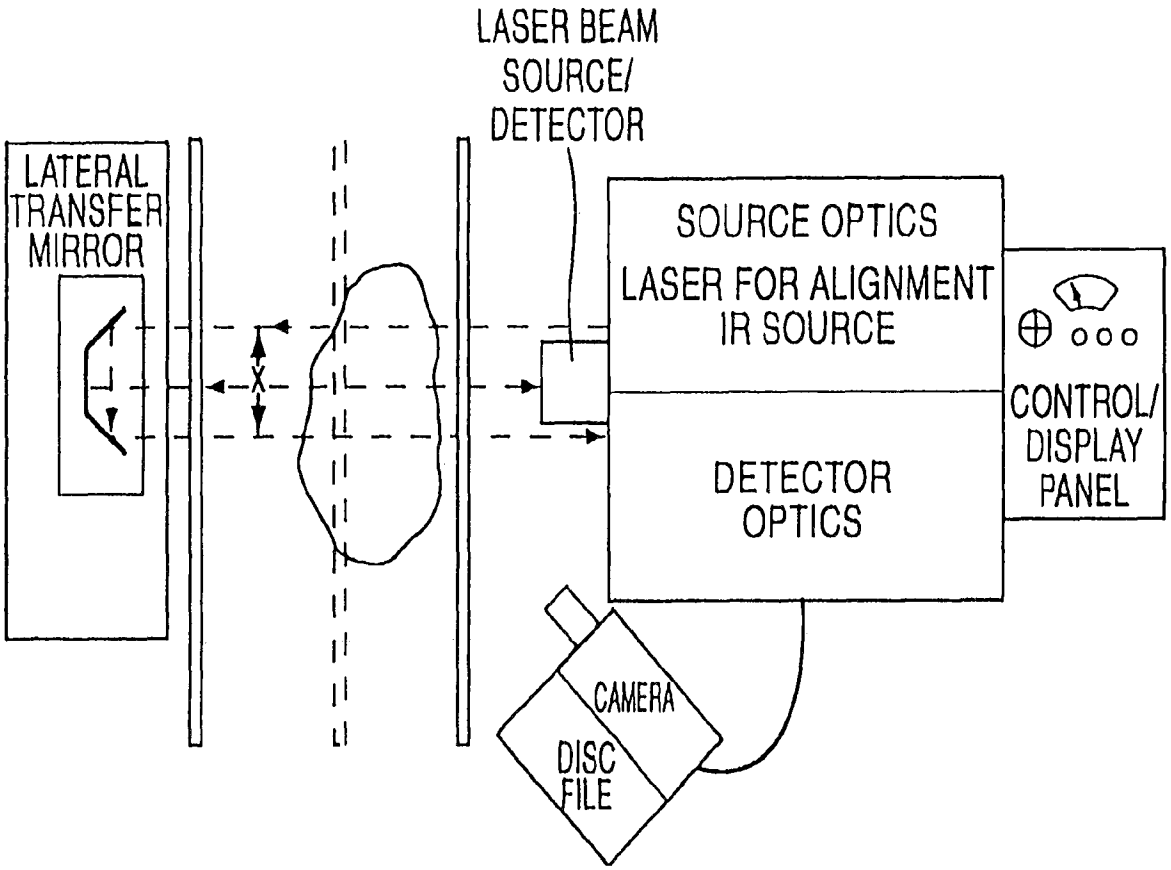
FIG. 5 (PRIOR ART)
FIG. 5 is a vehicle emission testing unit known in the prior art and useful with the embodiment of the present invention.

A calculating circuit 60, as illustrated in the block diagram of FIG. 2, is included in analyzer 20 of the present invention. The calculating circuit 60 calculates the speed and the rate of change of the speed using the fixed distance, d, and from each of the eight time values recorded by the recorder 50 for the various events. The calculating circuit 60 may include a computer, calculator, and/or any device, mechanism or algorithm for manipulating data and/or performing mathematical operations on the data, in order to calculate the speed, S, and acceleration, A, as will be described below. A suitable calculating circuit 60 is shown in FIG. 4. The values that the calculating circuit 60 calculates represents the speed, S, in miles per hour, or kilometers per hour, of the front and rear wheels and using the stored speed values, the calculating circuit 60 calculates the acceleration, A, of the motor vehicle 11 in miles per hour per hour, feet per second per second, centimeters per second per second, or whatever units are best used in the vehicle emissions testing unit 70, such as the one described in the above-identified U.S. Pat. No. 5,343,043 and as shown in FIG. 5 herein.

Figure 3:
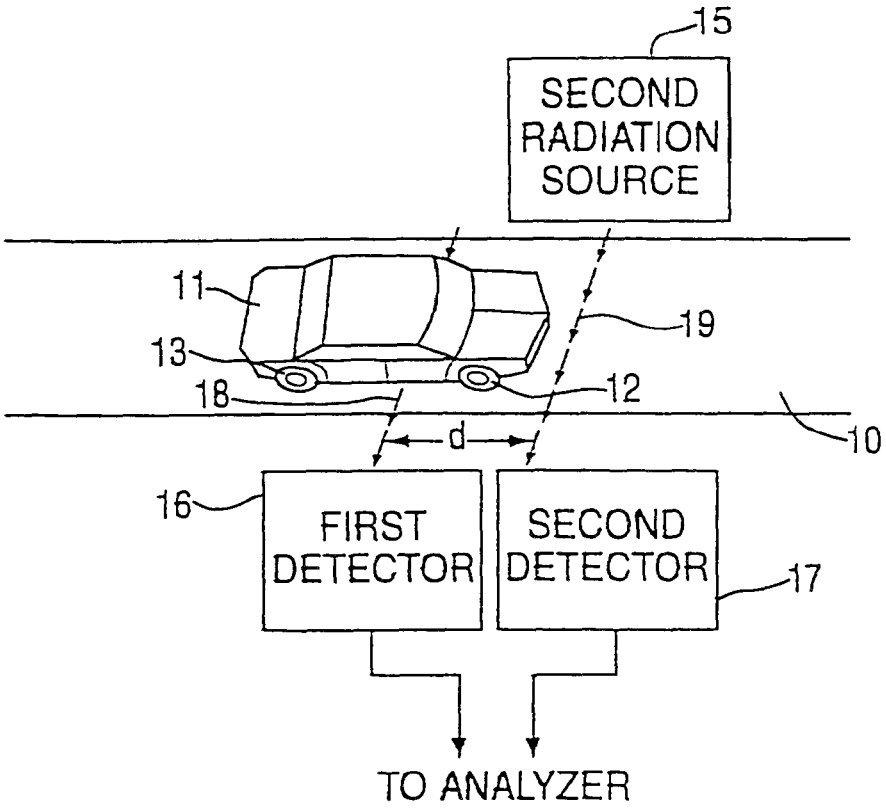
FIG. 3 is an pictorial view of a portion of the present invention.

As illustrated in FIG. 3, the motor vehicle 11 has at least a front wheel 12 and a rear wheel 13. In a preferred embodiment, the first radiation source 14, the second radiation source 15, the first detector 16 and the second detector 17 are arranged to allow the front wheel 12 and the rear wheel 13 of a motor vehicle 11 to break and make each of the entrance laser beam 18 and exit laser beam 19. The visible laser beams 18, 19 are spaced apart by a distance d that is less then the wheelbase of the vehicle. Thus, in order to measure speed, S, and acceleration, A, of the motor vehicle 11 using the front wheel 12 and rear wheel 13, the time of the following events, which are determined by the determining circuit 40 and the timer 30 are recorded by the recorder 50:

t1a is the time when the front wheel breaks the entrance laser beam;

t1b is the time when the front wheel leaves the entrance laser beam;

t2a is the time when the front wheel breaks the exit laser beam;

t2b is the time when the front wheel leaves the exit laser beam;

t3a is the time when the rear wheel breaks the entrance laser beam;

t3b is the time when the rear wheel leaves the entrance laser beam;

t4a is the time when the rear wheel breaks the exit laser beam; and t4b is the time when the rear wheel leaves the exit laser beam.

As shown in the block diagram in FIG. 2, the preferred embodiment includes a timer 30 for measuring time. The timer 30 starts counting upon the front wheel 12 of the motor vehicle 11 breaking the entrance laser beam 18.

In the preferred embodiment, the calculating circuit 60, as illustrated generally in the block diagram of FIG. 2 and shown more specifically in FIG. 4, calculates speed, S, and acceleration, A, from the fixed distance, d, and from each time for the various events recorded by the recorder 50. In a preferred embodiment, the calculating circuit 60 calculates the speed, S, as S=(Speeda+Speedb)/2 and the acceleration, A, as A=(Accela+Accelb)/2; wherein:

Speeda=(S2a+S1a)/2;

Speedb=(S2b+S1b)/2;

S1a=d/(t2a-t1a)*(3600/(5280*12));

S1b=d/(t2b-t1b)*(3600/(5280*12));

S2a=d/(t4a-t3a)*(3600/(5280*12));

S2b=d/(t4b-t3b)*(3600/(5280*12));

Accela=DeltaVa/DeltaTa;

Accelb=DeltaVb/DeltaTb;

Delta Va=S2a-S1a;

Delta Ta=((t3a-t1a)+(t4a-t2a))/2;

Delta Vb=S2b-S1b;

Delta Tb=((t3b-t1b)+(t4b-t2b))/2;

The constant 3600/(5280*12) converts units from inches per second to miles per hour.

In addition to reducing and/or eliminating the above-mentioned problems, the use of a radiation source and detector arrangement, as shown in FIG. 3, to provide visible laser beams 18, 19, at a position, that is, height, above the roadway 10 so as to detect the wheels 12, 13, only, would also gather twice as much data as simply detecting the front portion of the motor vehicle, that could be used for verification against the first measurement of speed, S, and acceleration, A.

In operation, when a two axle motor vehicle 11 is driven along a roadway 10, the front wheel 12 breaks the visible entrance laser beam 18. The occurrence of this event as detected by detector 16 and indicated by a pulse from the determining circuit 40 starts the timer or counter 30. The recorder 50 records the time of this event as indicated by the timer 30. When the determining circuit 40 produces a pulse indicating that the entrance laser beam 18 is re-established, that is, make, the time of occurrence of this event as measured by the timer 30 is recorded by the recorder 50. When the determining circuit 40 indicates that the front wheel 12 breaks the exit laser beam 19, the time of this event as measured by the timer 30 is recorded by the recorder 50. When the determining circuit 40 indicates that the exit laser beam 19 is re-established, that is, make, the time of occurrence of this event as measured by the timer 30 is recorded by the recorder 50. When the determining circuit 40 indicates that the rear wheel 13 breaks the entrance laser beam 18 the recorder 30 records the time of occurrence of this event as measured by the timer 30. When the determining circuit 40 indicates that the entrance laser beam 18 is re-established, that is, make, the time of occurrence of this event as measured by the timer 30 is recorded by the recorder 50. When the determining circuit 40 indicates that the rear wheel 13 breaks the exit laser beam 19, the time of occurrence of this event as measured by the timer 30 is recorded by the recorder 50. When the determining circuit 40 indicates that the exit laser beam 19 is re-established, that is, make, the time of occurrence of this event as measured by the timer 30 is recorded by the recorder 50. Using these stored values and the fixed distance d the speed, S, and the acceleration, A, of the motor vehicle 11 is then calculated.

As shown in FIGS. 1 and 2, the present invention includes a vehicle emissions test unit 70 for obtaining exhaust emissions data such as the relative concentrations of HC, CO and CO2 from motor vehicles 11. Conventional devices for obtaining exhaust emissions data are known in the art such as U.S. Pat. Nos. 5,343,043 (Johnson) and 5,210,702 (Bishop, et al.) and will not be described herein. The analyzer 20 may be a part of the vehicle emissions test unit 70 or can be a separate unit.

As shown in FIGS. 1 and 2, the present invention may include a read out device 80, such as a monitor or screen, a digital display or printer, to display information, such as speed and acceleration, of the motor vehicle 11.

The use of the present invention to obtain an accurate value for the speed, S, and acceleration, A, of a motor vehicle 11 which can be used in combination with vehicle emissions information obtained from the same motor vehicle 11, allows accurate and reliable information to be obtained regarding the motor vehicle 11 that is being driven along a roadway 10.

The events and data recorded in Table 1 below are indicative of a normal speed/acceleration test, and are only exemplary and should not be used to limit the scope of the invention as set forth herein.

TABLE 1

Speed and Acceleration Monitor Formulas and Sample Data

| Label | Length (inches) | |
|---|---|---|
| d | 70 | |
| Label | uSec | Event |
| T1 (t1a) | 0.000000 | Front wheel breaks entrance laser beam |
| T2 (t1b) | 0.070110 | Front wheel leaves entrance laser beam |
| T3 (t2a) | 0.194128 | Front wheel breaks exit laser beam |
| T4 (t2b) | 0.262409 | Front wheel leaves exit laser beam |
| T5 (t3a) | 0.308830 | Rear wheel breaks entrance laser beam |
| T6 (t3b) | 0.378142 | Rear wheel leaves entrance laser beam |
| T7 (t4a) | 0.499250 | Rear wheel breaks exit laser beam |
| T8 (t4b) | 0.567508 | Rear wheel leaves exit laser beam |

S1a = 70/(t2a − t1a) * (3600/(5280 * 12)) = 20.48789
S1b = 70/(t2b − t1b) * (3600/(5280 * 12)) = 20.68275
S2a = 70/(t4a − t3a) * (3600/(5280 * 12)) = 20.88684
S2b = 70/(t4b − t3b) * (3600/(5280 * 12)) = 21.00310
Delta Ta = ((t3a − t1a) + (t4a − t2a))/2 = 0.30698
Delta Tb = ((t3b − t1b) + (t4b − t2b))/2 = 0.30657
Delta Va = S2a − S1a = 0.39896
Delta Vb = S2b − S1b = 0.32035
Speeda = (S2a + S1a)/2 = 20.68737
Speedb = (S2b + S1b)/2 = 20.84293
S = Speeda + Speedb)/2 = 20.76515
Accela = Delta Va/Delta Ta = 1.299631
Accelb = Delta Vb/Delta Tb = 1.044949
A = (Accela + Accelb)/2 = 1.17229

Additionally, a system for detecting the speed of motor vehicles could also be used without emissions testing by law enforcement agencies. Such a system may be assembled at one location of the roadway and transmit information, such as the speed and a photograph of the motor vehicle, to a police officer waiting at another location along the roadway.

Thus, there has been described a method and apparatus for obtaining the speed and acceleration of a motor vehicle having many advantages. While the invention has been described in connection with preferred and illustrative embodiments, it should be understood that variations will occur to those skilled in the art, and the invention is to be limited only by the claims appended hereto and equivalents.

We claim:

1. Apparatus for determining speed and acceleration of a motor vehicle traveling on a roadway comprising:

a first radiation source producing a [visible entrance laser] *first* beam and arranged at one side of the roadway;

a first detector arranged at an opposite side of the roadway to receive said [visible entrance laser] *first* beam from said first radiation source for producing an output signal indicating a presence or absence of the [visible entrance laser] *first* beam;

a second radiation source producing a [visible exit laser] *second* beam and arranged at said one side of the roadway and being spaced apart by a predetermined distance from said first radiation source;

a second detector arranged at said opposite side of the roadway to receive said [visible exit laser] beam from said second radiation source for producing an output signal indicating the presence or absence of the [visible exit laser] *second* beam;

wherein front and rear wheels of the motor vehicle each interrupt said [visible entrance laser] *first* beam and said [visible exit laser] *second* beam and the interruptions are detected by said first and second detectors; [and]

*vehicle emissions testing means for obtaining exhaust emissions information for the motor vehicle; and* analyzing means receiving said output signals from said first and second detectors for calculating the speed and acceleration of the motor vehicle *to be used in combination with the obtained exhaust emissions information*.

2. The apparatus according to claim 1 wherein the analyzing means further comprises:

timing means for measuring time;

determining means for producing a pulse when said front wheel and rear wheel passes into and departs from said [visible entrance laser] *first* beam and said [visible exit laser] *second* beam, respectively;

memory means for storing each measured time when said determining means produces said pulse indicating that said front and rear wheels passed into and out of said [visible entrance laser] *first* beam and said [visible exit laser] *second* beam, respectively; and calculating means for calculating said speed and acceleration using said predetermined distance and each of said measured times recorded by said recording means.

[3. The apparatus according to claim 2 further comprising:

vehicle emissions testing means receiving said calculated speed and acceleration from said analyzing means for obtaining exhaust emissions data from the motor vehicle; and display means for displaying said speed and acceleration calculated by said analyzing means.]

4. The apparatus according to claim 2 wherein said predetermined distance is substantially equal to 70 inches.

5. The apparatus according to claim 2 wherein said [visible entrance laser] *first* beam and said [visible exit laser] *second* beam are unmodulated.

6. The apparatus according to claim 2 wherein said first detector and said second detector include a photo transistor having a lens and a bandpass filter.

7. A method for determining speed and acceleration of a motor vehicle traveling on a roadway comprising the steps of:

producing a plurality of [visible laser] beams spaced apart by a predetermined distance and directed across the roadway;

arranging the plurality of [visible laser] beams at a height to be interrupted by front and rear wheels of the motor vehicle;

determining when the front and rear wheels pass into and out of each of said plurality of [visible lasers] beams;

producing a time measurement at each determined occurrence;

recording each of said time measurements when the front and rear wheels pass into and out of each of said plurality of [visible laser] beams, respectively; [and]

calculating a speed value and an acceleration value from said fixed distance and each of the time measurements recorded in said step of recording*;*

*obtaining exhaust emissions data from the motor vehicle; and*

*utilizing the calculated speed value and the calculated acceleration value in an analysis of the obtained exhaust emissions data*.

[8. A method according to claim 7, further comprising the steps of:

obtaining exhaust emissions data from the motor vehicle; and displaying the calculated speed value and the calculated acceleration value.]

9. Apparatus for detecting acceleration of a motor vehicle passing along a roadway comprising:

means for producing first and second [visible laser] beams spaced apart by a predetermined distance on one side of the roadway and arranged at a height above the roadway so as each to be interrupted by a front wheel and a rear wheel of the motor vehicle;

detector means arranged at a side of the roadway opposite said one side for receiving said first and second [visible laser] beams and producing respective output signals indicating interruptions of said first and second [visible laser] beams by the front and rear wheels of the motor vehicle;

measuring means for receiving said output signals from said detector means for producing time measurements at each occurrence of said interruptions of said first and second [visible laser] beams and for producing time measurements at each resumption of each interrupted first and second [visible laser] beams; [and]

*vehicle emissions testing means for obtaining exhaust emissions information for the motor vehicle; and* calculating means receiving said time measurements from said measuring means for calculating an acceleration of the motor vehicle, based on said predetermined distance, *to be used in combination with the obtained exhaust emissions information*.

* * * * *